United States Patent [19]

Brouwers et al.

[11] Patent Number: 5,144,841
[45] Date of Patent: Sep. 8, 1992

[54] DEVICE FOR MEASURING PRESSURES AND FORCES

[75] Inventors: Arnoldus M. Brouwers, DN Wierden, Netherlands; Ahmed H. Amin, No. Attleboro; Francois A. Padovani, Westwood, both of Mass.

[73] Assignee: Texas Instruments Incorporated, Dallas, Tex.

[21] Appl. No.: 695,623

[22] Filed: May 3, 1991

Related U.S. Application Data

[63] Continuation of Ser. No. 485,117, Feb. 23, 1990, abandoned.

[51] Int. Cl.⁵ .............................................. G01L 9/00
[52] U.S. Cl. .................................... 73/706; 73/115; 73/119 A; 73/754; 73/756; 338/4
[58] Field of Search .............. 73/115, 119 A, 756, 73/754, DIG. 4, 706, 866.5, 727; 338/4

[56] References Cited

U.S. PATENT DOCUMENTS

| | | | |
|---|---|---|---|
| 3,031,591 | 4/1962 | Cary et al. | 73/754 |
| 3,395,564 | 8/1968 | Rastrelli et al. | 73/1 |
| 3,410,135 | 11/1968 | Reynaud | 73/141 |
| 4,258,565 | 3/1981 | Sawayama et al. | 73/141 |
| 4,620,438 | 11/1986 | Howng | 73/115 |
| 4,739,666 | 4/1988 | Hafner | 73/754 |

FOREIGN PATENT DOCUMENTS

| | | |
|---|---|---|
| 0145001 | 6/1985 | European Pat. Off. |
| 0179278 | 4/1986 | European Pat. Off. |
| 0255084 | 7/1987 | European Pat. Off. |
| 0185296 | 7/1988 | European Pat. Off. |
| WO83/00225 | 1/1983 | Fed. Rep. of Germany |
| 3228149 | 2/1984 | Fed. Rep. of Germany |
| 3502275 | 7/1986 | Fed. Rep. of Germany |
| 3517575 | 11/1986 | Fed. Rep. of Germany |
| 2514135 | 4/1983 | France |
| 2019581 | 10/1979 | United Kingdom ................ 73/754 |

*Primary Examiner*—Donald O. Woodiel
*Attorney, Agent, or Firm*—Russell E. Baumann; René E. Grossmann; Richard L. Donaldson

[57] ABSTRACT

The invention relates to a device for measuring pressures or forces, comprising a pressure or force sensor in the form of a piezoelectric or piezoresistive pressure or force transducer having at least one electric cable connected thereto, and an incompressible elastomer mass which transmits the pressure or force to be measured to the transducer.

7 Claims, 1 Drawing Sheet

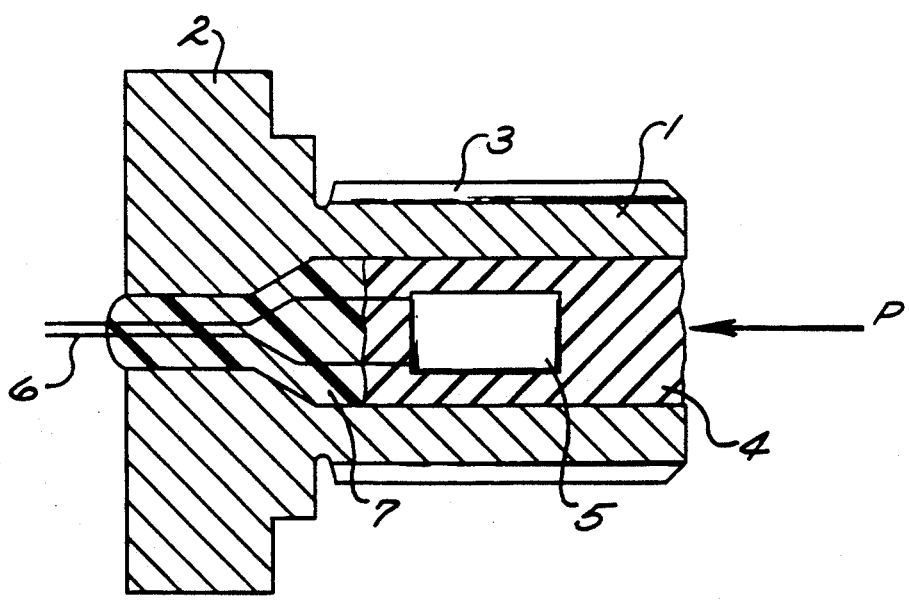

DEVICE FOR MEASURING PRESSURES AND FORCES

This is a continuation of application Ser. No. 485,117, filed Feb. 23, 1990, now abandoned.

BACKGROUND OF THE INVENTION

The field of the invention is that of pressure or force transducers and it relates more particularly to a piezoelectric or piezoresistive pressure transducer element embedded and fully enclosed in an incompressible elastomer mass.

Such devices are known and are used, inter alia, for measuring forces, accelerations and pressures. Examples are described in, inter alia, EP-B-0185296, EP-A-0145001, EP-A-0179278, DE-A-3517575 and DE-A-3228149. In these known devices at least one side of the piezoelectric or piezoresistive transducer element adjoins a membrane, plate or housing wall on one side. In view of the required accuracy and sturdiness in positioning of the element relative to the membrane, plate or wall, this had adverse consequences for the price, while in the event of a clamped membrane being used the sturdiness also leaves something to be desired.

BRIEF SUMMARY OF THE INVENTION

The object of the invention is to solve these problems and produce a pressure or force measuring device of the type mentioned in the preamble which can be made cheaply, is compact in structure, and is extremely sturdy and unlikely to develop faults.

According to the invention, the above-mentioned transducer is totally embedded in the above-mentioned elastomer mass and is enclosed by said mass on all sides.

What is essential for the invention is that the piezoelectric or piezoresistive transducer is hydrostatically loaded during the carrying out of pressure or force measurements. The transducer element will be made of anisotropic material; in the case of piezoelectric material the transducer is suitable only for dynamic measurements, and in the case of piezoresistive material both for dynamic and static measurements.

The elastomer mass will generally be accommodated in a housing which is open at one side in such a way that the medium of which the pressure is to be measured can come into direct contact with the mass.

The above-mentioned housing is preferably the hollow shank of a screw-threaded bolt. Such a bolt is easy to fit. In that case the above-mentioned electric cable(s) coming out of the elastomer mass will run inside the bolt through a space filled with a nonelastic, electrically insulating medium such as resin. The above-mentioned screw-threaded bolt can be screwed through a hole in the wall of a diesel injection pump, for example at the point for a vent bolt. In, for example, a service while the engine is running the device can give information on the injection moment, the wear on the pump, the opening pressure of the atomizer and the wear on the atomizer.

The elastomer mass is an electrical insulator, is free from gas inclusions, and is resistant to the medium (for example, diesel fuel) of which the pressure is to be measured. Suitable materials for the elastomer mass are a silicon gel and polyurethane.

In order to permit control of the diesel injection pattern during use in a diesel injection pump of the distributor type, the pressure transducer can be connected to a signal conditioner built into the device, such as an amplifier.

A temperature-dependent resistor can also be connected to the pressure or force transducer for the purpose of temperature compensation.

DESCRIPTION OF THE DRAWING

The invention will now be explained in greater detail with reference to the figure, in which an example of an embodiment is shown in longitudinal section.

DESCRIPTION OF THE PREFERRED EMBODIMENT

The device shown in the figure is designed in the form of a hollow screw-threaded bolt, provided with a hollow shank 1 and a hollow head 2. The screw thread of the shank is indicated by 3.

The hollow of the shank 1 is filled with an elastomer mass 4, which is incompressible and electrically insulating, and is free from gas inclusions.

A pressure transducer 5 of anisotropic piezoelectric or piezoresistive material is embedded in the elastomer mass 4 in such a way that the transducer is completely enclosed by said mass.

Two connecting wires 6 are fastened on the pressure transducer and run via the hollow in the bolt head to the outside. This hollow is filled with a non-elastic material 7 such as an epoxy resin.

At the shank end of the screw-threaded bolt the elastomer mass 4 is in direct contact with the environment.

The bolt has to be screwed through a hole in the wall of a system of which the pressure is to be measured, for example the wall 8 of a diesel injection pump of the distributor type. The pressure acts directly on the elastomer mass 2 which is flexible and pliable but not compressible so the pressure is transmitted hydrostatically to the pressure transducer 5.

The signal is conveyed to the outside via the wires 6. The non-elastic material 7 is used to absorb the pressure.

Where the above-described bolt is fitted in the wall of a diesel injection pump, the measurement while the engine is running can serve to provide information on the injection moment, wear on the pump, the opening pressure of the atomizer, and the wear on the atomizer. In addition, the determination of the injection moment could be used to control the diesel injection control means.

A piezoelectric transducer is suitable only for dynamic pressure measurements, while a piezoresistive transducer is suitable for both dynamic and static pressure measurements.

The screw-threaded bolt shown is only an example of an embodiment. Applications other than diesel injection pumps are also possible, and the pressure of other liquid or gaseous media can be established. The principle of the invention is suitable not only for establishing pressures, but also for establishing forces.

For the regulation of the injection moment of a diesel injection pump a signal conditioner such as an amplifier can be installed.

What is essential is the complete enclosure of the transducer on all sides by non-compressible elastomer material and, in the case of pressure measurement, the fact that the elastomer material is in direct contact with the pressure medium.

The bolt described is manufactured by first applying the epoxy resin, then fitting the bolt in a vacuum chamber, and then inserting a closed metering supply needle into said chamber on a suitable source for elastomer material, in which case the desired quantity of elastomer is drawn into the shank hollow without gas inclusions and stiffens.

It should be understood that although a particular embodiment of the invention is described by way of illustrating the invention, the invention includes all other embodiments following within the scope of the appended claims.

We claim:

1. Device for measuring pressures or forces, comprising a pressure or force sensor in the form of a piezoelectric or piezoresistive pressure or force transducer, and in which said transducer is totally embedded to be enclosed by a mass on all sides, characterized in that said mass comprises an incompressible elastomer selected to transfer a pressure or force to be measured hydrostatically to the transducer, the mass being accommodated in a housing which is open at at least one side in such a way that the medium of which the pressure is to be measured can come into direct contact with at least a portion of the mass to transfer the pressure or force hydrostatically to the transducer.

2. Device according to claim 1, characterized in that the elastomer mass is an electrical insulator, is free from gas inclusions, is resistant to the medium whose pressure is to be measured, and is selected from the group consisting of silicon gel and polyurethane.

3. Device according to claim 2, characterized in that the transducer is connected to a signal conditioner built into the device, such as an amplifier.

4. Device according to claim 2, characterized in that the signal conditioner includes a temperature-dependent resistor.

5. Device for measuring pressures or forces, comprising a pressure or force sensor in the form of a piezoelectric or piezoresistive pressure or force transducer having at least one electric cable connected thereto, and an incompressible elastomer mass which transfers the pressure or force to be measured to the transducer characterized in that said transducer is totally embedded in said elastomer mass and is enclosed by said mass on all sides, said mass is accommodated in a housing which is open at one side in such a way that the medium of which the pressure is to be measured can come into direct contact with the mass, and said housing is the hollow shank of a screw-threaded bolt.

6. Device according to claim 5, characterized in that said electric cable(s) coming out of the elastomer mass will run inside the bolt through a space filled with a non-elastic, electrically insulating medium such as resin.

7. Device according to one of claim 5, characterized in that said screw-threaded bolt is screwed through a hole in the wall of a diesel injection pump.

* * * * *